(12) United States Patent
Duenisch et al.

(10) Patent No.: US 6,885,187 B2
(45) Date of Patent: Apr. 26, 2005

(54) TRANSMITTER SYSTEM FOR A FERRARIS MOTION TRANSMITTER

(75) Inventors: Paul Duenisch, Niederlauer (DE); Roland Finkler, Erlangen (DE); Rainer Siess, Erlangen (DE); Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 67 days.

(21) Appl. No.: 10/299,592

(22) Filed: Nov. 19, 2002

(65) Prior Publication Data
US 2003/0094940 A1 May 22, 2003

(30) Foreign Application Priority Data
Nov. 19, 2001 (DE) .......................... 101 56 782

(51) Int. Cl.[7] .............. G01P 3/46; G01B 7/14
(52) U.S. Cl. ............. 324/164; 324/207.25; 324/207.18
(58) Field of Search ................. 324/164, 175, 324/179, 207.16, 207.2, 207.21, 207.25, 207.15, 207.18; 73/514.31, 862.331, 862.333

(56) References Cited

U.S. PATENT DOCUMENTS

| | | | | |
|---|---|---|---|---|
| 4,053,826 A | * | 10/1977 | Wasawa et al. | 324/207.16 |
| 4,479,390 A | * | 10/1984 | Meixner | 73/862.333 |
| 4,803,885 A | * | 2/1989 | Nonomura et al. | 73/862.333 |
| 4,947,035 A | * | 8/1990 | Zook et al. | 250/225 |
| 6,481,296 B1 | * | 11/2002 | Jin et al. | 73/862.331 |
| 6,650,106 B1 | * | 11/2003 | Daalmans et al. | 324/164 |

FOREIGN PATENT DOCUMENTS

| | | |
|---|---|---|
| DE | OS 1 673 439 | 4/1971 |
| DE | 19 63 266 | 6/1971 |
| DE | 33 14 567 C1 | 5/1984 |
| DE | 37 30 841 A1 | 3/1988 |
| EP | 0 819 944 A1 | 1/1998 |

\* cited by examiner

*Primary Examiner*—Anjan K. Deb
(74) *Attorney, Agent, or Firm*—Henry M. Feiereisen

(57) ABSTRACT

A transmitter system for a Ferraris motion transmitter, includes a magnetic measuring arrangement including at least one magnetic field generator for generating a magnetic field and an electrically conductive measuring body, with the magnetic field generator and the measuring body movable relative to one another in operation. Coupled to the magnetic measuring arrangement is a magnetic field sensor for providing an output signal commensurate with a velocity or acceleration of the measuring body. At least one of the magnetic field generator and the magnetic field sensor includes at least two magnetic members interlocking one another in concentric relationship to the measuring body for guiding the magnetic field as a result of eddy currents forming during operation.

14 Claims, 4 Drawing Sheets

TRANSMITTER SYSTEM FOR A FERRARIS MOTION TRANSMITTER

CROSS-REFERENCES TO RELATED APPLICATIONS

This application claims the priority of German Patent Application, Serial No. 101 56 782.0, filed Nov. 19, 2002, pursuant to 35 U.S.C. 119(a)–(d), the disclosure of which is incorporated herein by reference.

BACKGROUND OF THE INVENTION

The present invention relates to a transmitter system for a Ferraris motion transmitter.

A typical transmitter system for a Ferraris motion transmitter includes one or more magnetic field generators which form together with an electrically conducting measuring body a magnetic measuring arrangement, whereby magnetic field generator(s) and the measuring body move relative to one another during operation. A magnetic field sensor is linked to the magnetic measuring arrangement to provide a speed-dependent or acceleration-dependent output signal. Such a transmitter system is disclosed, for example, in an article by A. Denne. H. Rausch and W, Freise, entitled "Aufnehmer zur Messung sctinell veränderlicher Drehbeschleunigungen und Drehmomente" [*Measuring of dynamic angular acceleration and torque*], and published in Technisches Messen 48, 1981, Number 10, page 339 to 342. Hereby, the measuring body is implemented as a rotating bell-shaped rotor.

German patent publication DE 37 30 841 A1 discloses a further transmitter system of this type in which the measuring body is implemented as disk.

Provision of a transmitter system of simple and compact structure is desirous because of cost-saving aspects and small outer dimensions to satisfy an increasing demand for miniaturization and to allow their use in volume-critical devices. Conventional transmitter systems have a mechanical play between measuring body and other components of the transmitter system that may result in measuring errors. In conjunction with a rotating measuring body, the mechanical play may result in a misalignment between the symmetry axis of the measuring body and the shaft and/or the measuring body is not entirely rotation-symmetric. Other errors may be caused, for example, through eccentricity, wobbling or inhomogeneities of the measuring body. To address this problem, it was proposed to use at least two magnetic field sensors which are evenly spaced about a circumference. This, however, resulted in a more complicated structure of the transmitter system.

It would therefore be desirable and advantageous to provide an improved transmitter system which obviates prior art shortcomings and is simple in structure while yet being reliable in operation and producing enhanced measuring quality.

SUMMARY OF THE INVENTION

According to one aspect of the present invention, a transmitter system for a Ferraris motion transmitter includes a magnetic measuring arrangement having at least one magnetic field generator for generating a magnetic field and an electrically conducting measuring body, with the magnetic field generator and the measuring body movable relative to one another in operation, and a magnetic field sensor coupled to the magnetic measuring arrangement for providing an output signal commensurate with a velocity or acceleration of the measuring body, wherein at least one of the magnetic field generator and the magnetic field sensor includes at least two magnetic members interlocking one another in concentric relationship to the measuring body for guiding the magnetic field as a result of eddy currents forming during operation.

The present invention resolves prior art problems by providing the transmitter system with at least two interlocking magnetic members in concentric relationship to the measuring body. In this way, the transmitter system according to the present invention can operate reliably by using only a single magnetic field sensor which, for example, may include a coil and partially surrounds the magnetic member, for detecting the magnetic field forming by the eddy currents of the measuring body during operation. As a consequence, not only is the signal readout simplified but also the assembly of the transmitter system is significantly facilitated, because material can be saved and the assembly time of the transmitter system can be shortened. Moreover, it is possible that at least one magnet produces a magnetic field which can be guided by the at least two interlocking magnetic members in concentric relationship to the measuring body.

According to another feature of the present invention, the magnetic field generator defines a magnetic field source direction in parallel relationship to the axis of the measuring body, with the magnetic field being guided by at least two exciter-side claw poles having magnetic field poles in concentric relationship to the measuring body and arranged such that the magnetic field poles of the claw poles alternatingly interlock one another. As a result, a plurality of exciter-side poles can be provided already with a single magnet. The magnet may hereby be configured as permanent magnet or as electromagnet.

According to another feature of the present invention, the magnetic field sensor delivers an output signal in dependence on the magnetic field strength in the magnetic members as an end signal and intermediate signal. Suitably, the signal may be an electric signal and optical signal. Electrical signals outputted by the magnetic field sensor can easily be processed in an electronic processing or evaluation assembly. Optical signals can also be converted by signal converters into electrical signals and are advantageous because they can be tapped in a potential-free manner.

According to another feature of the present invention, the magnetic field sensor may include at least one coil with at least one winding for partially surrounding at least one sensor-side claw-pole ring guiding the magnetic field during operation. In this way, the claw-pole ring can be used to detect the magnetic fields formed by the eddy currents during operation. Suitably, the at least one coil may be arranged in concentric relationship to the measuring body. As a result, the assembly of the transmitter system is significantly simplified, and, moreover, a sensor signal can already be evaluated which detects integrally the magnetic field of the transmitter system.

According to another feature of the present invention, the magnetic field sensor may include at least one Hall element, or a magnetoresistive sensor, or a magnetooptic sensor.

According to another embodiment of the present invention, the magnetic fields of at least two magnetic field generators pass through the measuring body, whereby the magnetic field generators are arranged on a radius in concentric relationship to the measuring body and alternatingly poled with different polarity. The concentric disposition of the magnetic field generators upon a radius in alternatingly poled manner allows detection of rotary motions of a rotating measuring body.

According to another feature of the present invention, the magnetic field sensor may include at least one current-carrying coil with at least one winding for providing a magnetic field source, wherein alternating current or direct current can be impressed upon the coil. As a consequence, at least one electromagnet may be useable.

According to another embodiment of the present invention, the transmitter system may include at least two magnetic field sensors, each including, e.g., a coil with at least one winding, wherein the useful fields, effected as a result of the relative movement of the measuring body, in the magnetic field sensors are oppositely directed, and wherein the output signals of the magnetic field sensors are subtracted by the at least two magnetic field sensors. In this way, the sensitivity is enhanced as the useful signals are added up.

According to another feature of the present invention, there is provided a magnetic shielding for at least partly shielding components of the transmitter system. In this way, magnetic noise fields from the measuring system of the transmitter system can be eliminated. Of course, the magnetic shielding may also be realized by the housing of the transmitter system.

A transmitter system according to the present invention results in significant cost savings as far as manufacture and assembly thereof are concerned.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
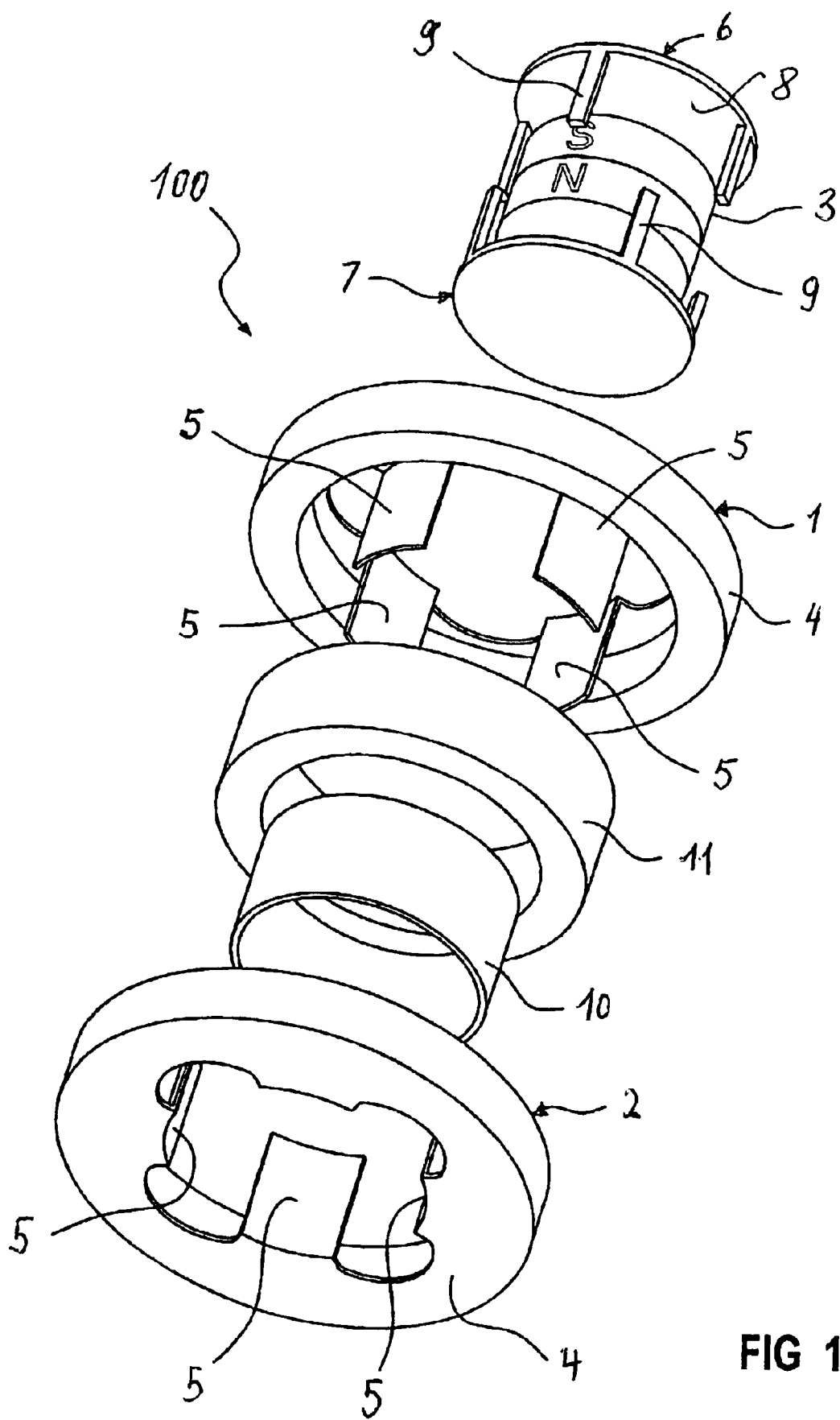
FIG. 1 is a perspective view, in exploded illustration, of a first embodiment of a Ferraris motion transmitter according to the present invention.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a perspective view, in exploded illustration, of a first embodiment of a transmitter system 100 according to the present invention in the form of a Ferraris motion transmitter. The transmitter system 100 includes a magnetic field sensor comprised of a coil 11 and magnetic members in the form of claw-pole rings, generally designated by reference characters 1, 2, and a magnetic field generator 3. The claw-pole rings 1, 2 are of an identical construction, and each includes a carrier 4 which has a plurality of sensor-side claw poles 5. In the assembled state, the claw-pole rings 1, 2 are placed adjacent one another in superimposed disposition, with the claw poles 5 opposing and interlocking one another in parallel relationship to the main axis of the transmitter system 100.

The magnetic field generator 3 is placed inwardly of the claw-pole rings 1, 2 and has a magnetic north pole N and a magnetic south pole S. Magnetic members, generally designated by reference numerals 6, 7 and configured as claw-pole rings encircle in opposite disposition the magnetic field generator 3. The magnetic members 6, 7 are of an identical construction, and each includes a disk-shaped base area 8 and a plurality of exciter-side claw poles 9 which extend from the base area 8 at a right angle in parallel relationship to the main axis of the transmitter system 100. The magnetic field generator 3 has a cylindrical configuration, with the magnetic members 6, 7 respectively adjoining the circular end faces of the magnetic field generator 3 with their circular base areas 8. Thus, in the assembled state of the motion transmitter, the exciter-side claw poles 9 encircle the magnetic field generator 3.

The magnetic field generator 3 produces a main magnetic field which has a magnetic field source direction generally parallel to the main axis of the transmitter system 100 and passes through the magnetic members 6, 7.

A measuring body 10, whose velocity or acceleration is to be ascertained, is movable relative to the magnetic field generator 3 and its magnetic members 6, 7 and may be secured, for example, to a driven shaft (not shown). The measuring body 10 is made of electrically conductive material. Thus, as the measuring body 10 moves, the main magnetic field induces eddy currents in the conductive material of the measuring body 10, which in turn generate magnetic fields. The eddy currents and thus the resultant magnetic fields are velocity-dependent and acceleration-dependent. The magnetic fields caused by the measuring body 10 are detected by the magnetic field sensor of the transmitter system 100 to output a respective signal. The magnetic fields are sensed and guided with proper polarity by the sensor-side claw poles 5. Hereby, the number of sensor-side claw poles 5 matches the number of exciter-side claw poles 9.

The transmitter system 100 according to the present invention is simple in structure and compact. In the assembled state, the sensor coil 11 surrounds the claw poles 5 of the claw-pole rings 1, 2 about the main axis. The magnetic members 1, 2 of the magnetic field sensor encircle the coil 11 and contact one another at their confronting sides of the sensor-side carriers 4. In this way, the magnetic circuit is completed at these areas substantially without air gap. The coil 11 encircles the magnetic field in the claw poles 5 of the magnetic members 1, 2 and thus can output a sensor signal representative of the magnetic field.

Figure 2:
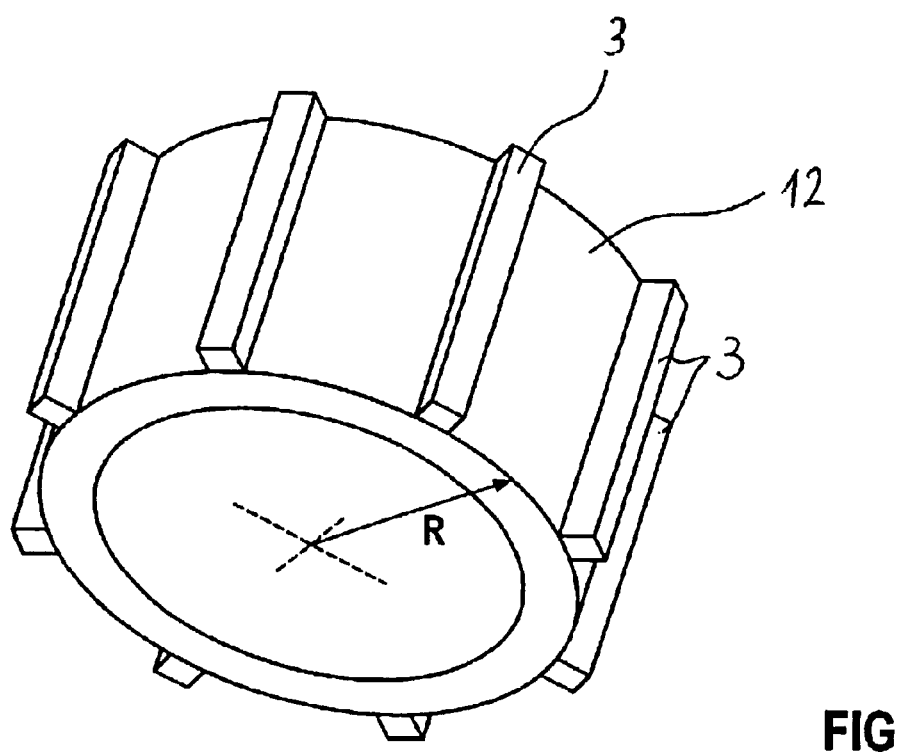
FIG. 2 is a detailed perspective view of a magnetic field generator.

Turning now to FIG. 2, there is shown an arrangement of magnetic field generators 3, whereby the magnetic field generators 3 are oriented on a radius R in concentric relationship to the main axis of the transmitter system 100. The magnetic field generators 3 are arranged on a base carrier 12 in a manner that their magnetic field poles alternate. The base carrier 12 has a hollow cylindrical shape without circular outer surfaces and is oriented perpendicular to the axis of the transmitter system 100. The magnetic field generators 3 may be realized as permanent magnets or electromagnets.

Figure 3:
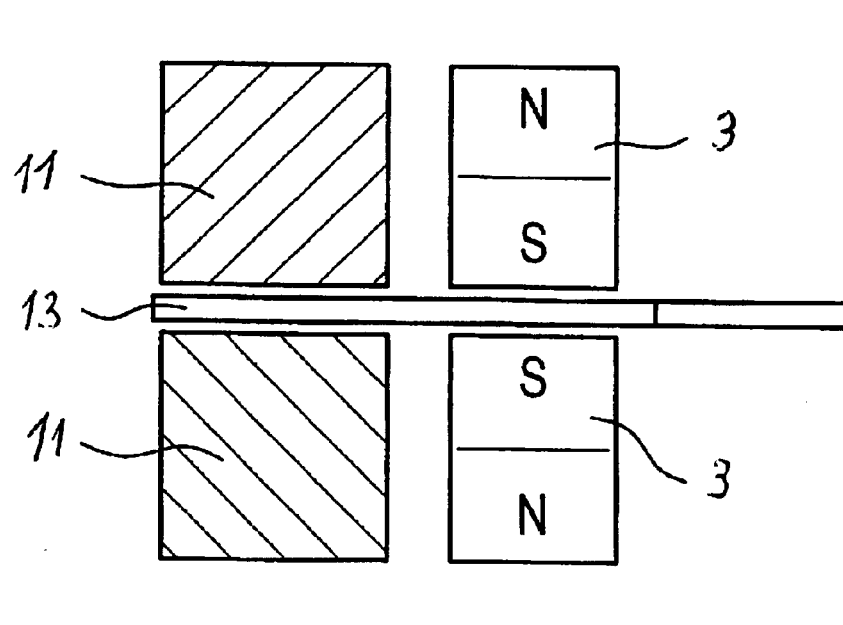
FIG. 3 is a schematic partly sectional illustration of sensor coils and magnetic fields generators.
Figure 4:
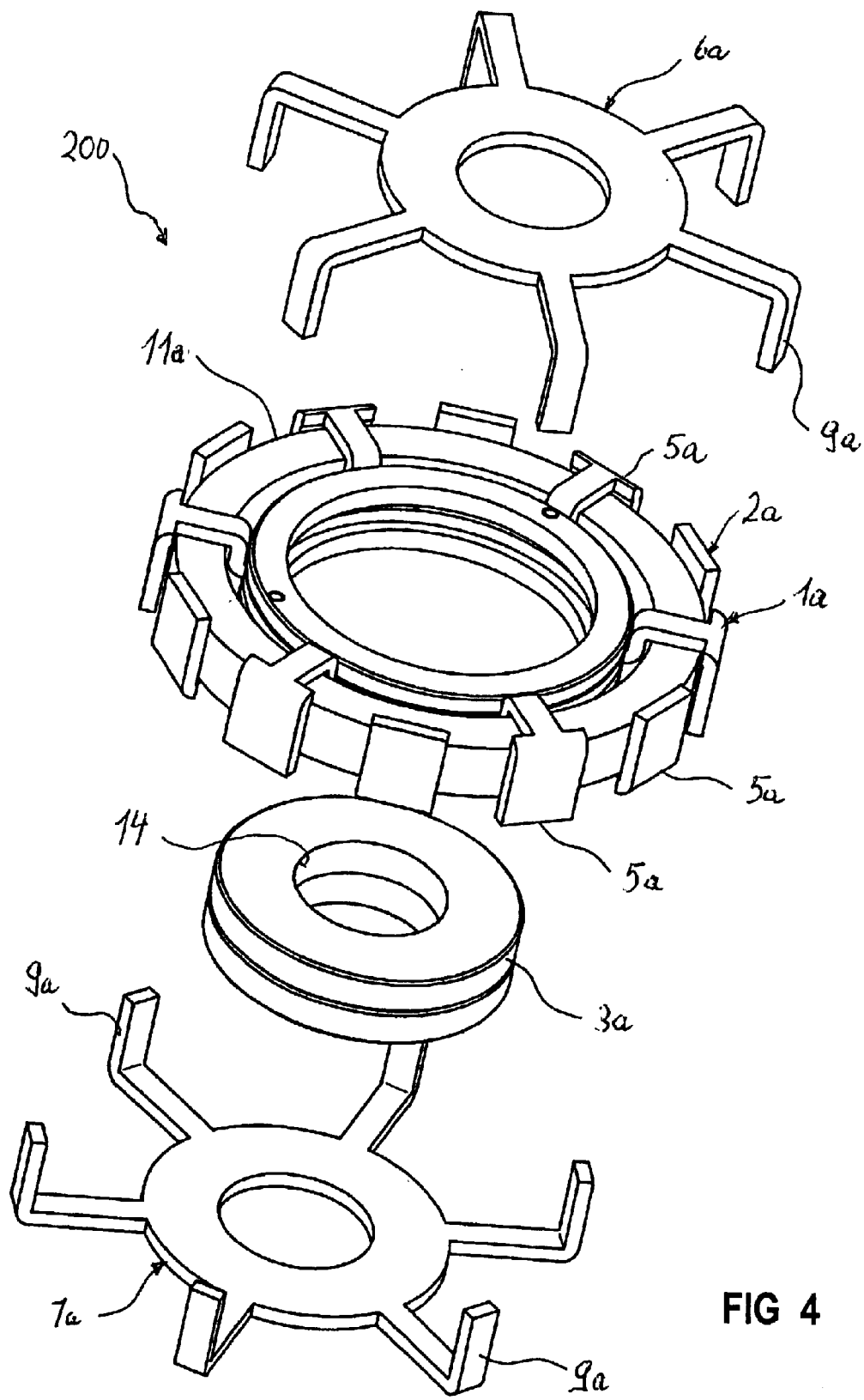
FIG. 4 is a perspective view, in exploded illustration, of a second embodiment of a Ferraris motion transmitter according to the present invention.

FIG. 3 shows a schematic partly sectional view of sensor coils 11 and magnetic field generators 3 of a transmitter system comprised of two motion transmitters in axial superimposed disposition, whereby each motion transmitter is configured in accordance with the illustration of FIG. 4. For sake of simplicity, FIG. 3 shows only one half of the transmitter system with respect to the main axis and only by way of the coils 11 and their pertaining magnetic field generators 3. Disposed above and below a carrier 13 are the coils 11 with different sense of winding. The magnetic field generators 3 are positioned interiorly in concentric relationship to the coils 11. The magnetic field source direction of the superimposed generators 3 is hereby in opposite direction. As a consequence of this construction, shown only partly in FIG. 3, magnetic noise signals are eliminated from the sensor signal by subtracting the individual signals of the coils 11. Therefore, the resultant output signal of the magnetic field sensor is doubled and an interfering magnetic field is eliminated. An interfering magnetic field results in sensor signals of same magnitude but different sign in the respective coils 11.

FIG. 4 shows a perspective view, in exploded illustration, of a second embodiment of a transmitter system in the form of Ferraris motion transmitter according to the present invention, generally designated by reference numeral 200. Parts corresponding with those in FIG. 1 will be identified by corresponding reference numerals followed by an "a". In this embodiment, the exciter-side claw-pole rings 6a, 7a partly encircle the sensor-side claw-pole rings 1a, 2a with their claw poles 5a. In contrast to the embodiment of FIG. 1, the coil 11a is positioned interiorly in concentric relationship to the claw poles 9a of the exciter-side claw-pole rings 6a, 7a and, at the same time, interiorly in concentric relationship to the claw poles 5a of the sensor-side claw-pole rings 1a, 2a.

The magnetic field generator 3a of the transmitter system 200 is positioned interiorly in concentric relationship to the sensor coil 11a and the sensor-side claw poles 5a and has a generally cylindrical configuration with circular base surface, with a cylindrical central bore 14 being formed in the magnetic field generator 3a. The magnetic field of the magnetic field generator 3a is passed with proper polarity through the exciter-side magnetic members (claw-pole rings) 6a, 7a about the entire arrangement. The magnetic members 6a, 7a adjoin opposite base surfaces of the magnetic field generator 3a and encircle the entire transmitter system 200. In the exemplified embodiment of FIG. 4, the magnetic members 6a, 7a have a substantially pot-shaped configuration, with the claw poles 9a extending like prongs in parallel relationship to the main axis of the transmitter system 200. A measuring body, not shown in FIG. 4, moves in concentric relationship to the main axis of the transmitter system outside the exciter-side claw poles 9a and the sensor-side claw poles 5a.

Figure 5:
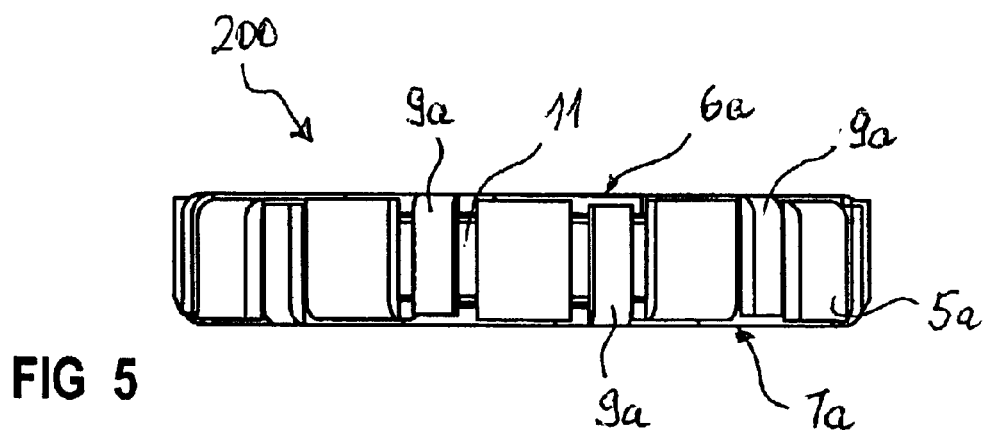
FIG. 5 is a side view of the assembled Ferraris motion transmitter of FIG. 4.
Figure 5A:
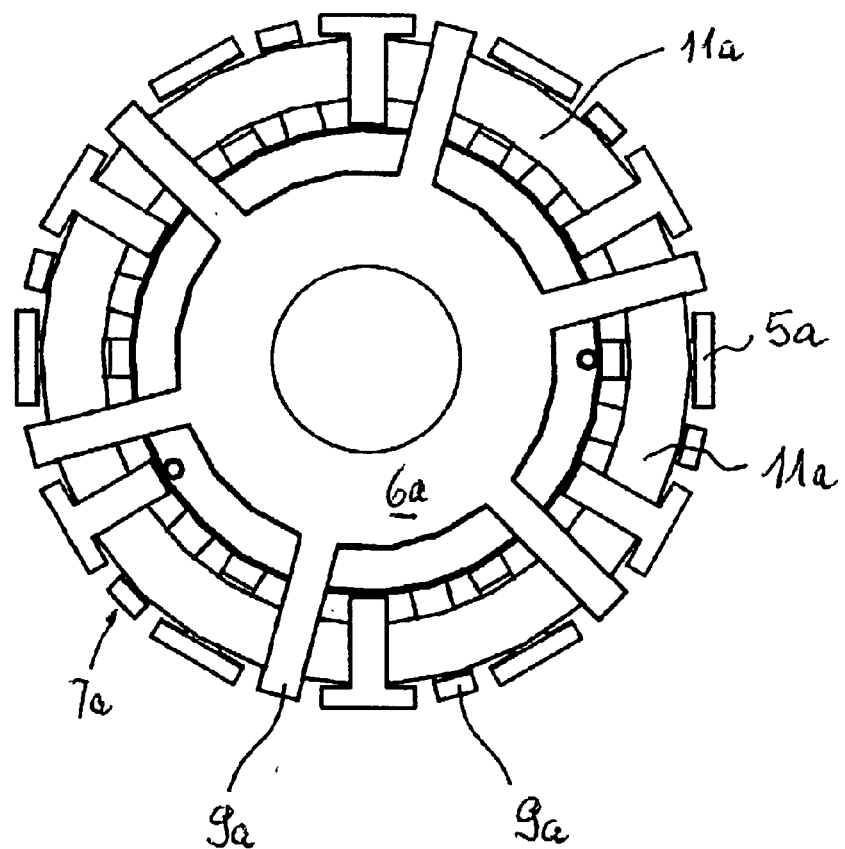
FIG. 5a is a top view of the assembled Ferraris motion transmitter of FIG. 4.

FIGS. 5 and 5a show side and top views of the transmission system 200 of FIG. 4. Of course, the transmitter system 200 must contain much mechanical apparatus which does not appear in the foregoing Figures for the sake of simplicity, e.g. a housing and the measuring body. FIG. 5 shows the transmitter system 200 in a position generally perpendicular to the main axis direction. The exciter-side claw poles 9a encircle hereby with proper polarity the sensor coil 11a with pertaining claw poles 5a. In the top view of FIG. 5a, the transmitter system 200 is shown as viewed in parallel direction to the main axis. The magnetic member 6a can be seen here in particular, with the claw poles 9a radiating in a star-like manner and bent at their outer edge by 90° so as to be oriented in main axis orientation.

Also the transmitter system 200 according to the present invention is simple in structure and compact. A multiplication of the pole number, which is desirable for reducing revolution-periodic noise signals as a result of eccentricity, wobbling or inhomogeneities in the measuring body, is easily possible. This is also desirable because smaller dimensions of the individual poles and thus smaller time constants and better dynamics can be realized. The respective claw poles can be formed through punching processes and subsequent bending to provide the final shape. The sensor exciter-side magnetic members 1, 2; 1a, 2a and the exciter-side magnetic members 6, 7; 6a, 7a may be made of ferromagnetic material.

While the invention has been illustrated and described in connection with currently preferred embodiments shown and described in detail, it is not intended to be limited to the details shown since various modifications and structural changes may be made without departing in any way from the spirit of the present invention. For example, it is certainly possible to apply further measures to enhance the measuring capabilities of the transmitter system, e.g. measures commonly utilized in transformers (core lamination). The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A transmitter system for a Ferraris motion transmitter, comprising:

a magnetic measuring arrangement including at least one magnetic field generator for generating a magnetic field and an electrically conductive measuring body, which defines an axis, wherein the magnetic field generator and the measuring body are movable relative to one another in operation, a magnetic field sensor coupled to the magnetic measuring arrangement for providing an output signal commensurate with a velocity or acceleration of the measuring body, wherein at least one of the magnetic field generator and the magnetic field sensor includes at least two magnetic members disposed opposite to one another in concentric relationship to the measuring body and constructed to overlappingly engage one another for guiding the magnetic field as a result of eddy currents forming during operation; and a second said magnetic field sensor, wherein useful fields, effected as a result of a relative movement of the measuring body in the magnetic field sensors are oppositely directed, wherein the output signals of the magnetic field sensors are subtracted.

2. The transmitter system of claim 1, wherein the magnetic field produced by the magnetic field generator defines a magnetic field source direction in parallel relationship to the axis of the measuring body, wherein the two magnetic members are part of the magnetic field generator and configured in the form of claw poles having magnetic field poles in concentric relationship to the measuring body and arranged such that the magnetic field poles of one of the claw poles alternatingly interlock with the magnetic field poles of the other one of the claw poles.

3. The transmitter system of claim 1, wherein the output signal of each of the magnetic field sensors is outputted in dependence on a magnetic field strength in the magnetic members as one of an end signal and intermediate signal.

4. The transmitter system of claim 3, wherein the output signal is one of an electric signal and optical signal.

5. The transmitter system of claim 1, wherein each of the magnetic field sensors includes at least one coil with at least one winding for partially surrounding at least one sensor-side claw-pole ring guiding the magnetic field during operation.

6. The transmitter system of claim 5, wherein the at least one coil is arranged in concentric relationship to the measuring body.

7. The transmitter system of claim 1, wherein each of the magnetic field sensors includes an element selected from the group consisting of at least one Hall element, magnetoresisitive sensor, and magnetooptic sensor.

8. The transmitter system of claim 1, wherein the magnetic measuring arrangement includes a second such magnetic field generator for generating a second magnetic field, said magnetic fields of the magnetic field generators passing through the measuring body, said magnetic field generators arranged on a radius in concentric relationship to the measuring body and alternatingly poled with different polarity.

9. The transmitter system of claim 1, wherein each of the magnetic field sensors includes at least one current-carrying coil with at least one winding for providing a magnetic field source, wherein one of alternating current or direct current is impressed upon the coil.

10. The transmitter system of claim 1, and further comprising a magnetic shielding for at least partly shielding components of the transmitter system.

11. The transmitter system of claim 1, wherein the two magnetic members are each configured in the form of a claw-pole ring with a plurality of claw poles.

12. The transmitter system of claim 1, wherein the two magnetic members are part of the magnetic field sensor, each of the magnetic members including a base carrier and a plurality of claw poles projecting at a substantially right angle from the base carrier.

13. The transmitter system of claim 1, wherein the two magnetic members are part of the magnetic field generator, each of the magnetic members including a base carrier and a plurality of claw poles radiating from the base carrier in a star-shaped configuration and having ends bent inwardly at a substantially right angle from the base carrier.

14. A transmitter system for a Ferraris motion transmitter, comprising:
  a magnetic measuring arrangement including at least one magnetic field generator for generating a magnetic field and an electrically conducting measuring body, which is defined by an axis, with the magnetic field generator and the measuring body movable relative to one another in operation; and
  two magnetic field sensors coupled to the magnetic measuring arrangement for providing output signals commensurate with a velocity or acceleration of the measuring body, wherein useful fields, effected as a result of a relative movement of the measuring body in the magnetic field sensors are oppositely directed, wherein the output signals of the magnetic field sensors are subtracted.
  wherein the magnetic field produced by the magnetic field generator defines a magnetic field source direction in parallel relationship to the axis of the measuring body, said magnetic field generator including at least two magnetic members configured in the form of claw poles having magnetic field poles in concentric relationship to the measuring body and arranged such that the magnetic field poles of one of the claw poles alternatingly and overlappingly interlock with the magnetic field poles of the other one of the claw poles.

* * * * *

UNITED STATES PATENT AND TRADEMARK OFFICE
CERTIFICATE OF CORRECTION

PATENT NO. : 6,885,187 B2
DATED : April 26, 2005
INVENTOR(S) : Paul Duenisch et al.

It is certified that error appears in the above-identified patent and that said Letters Patent is hereby corrected as shown below:

Column 7,
Lines 13-14, change "magnetoresisitive" to -- magnetoresistive --.

Signed and Sealed this

Twenty-seventh Day of September, 2005

JON W. DUDAS
*Director of the United States Patent and Trademark Office*